(12) United States Patent
Böhm et al.

(10) Patent No.: US 6,834,914 B2
(45) Date of Patent: Dec. 28, 2004

(54) WIND DEFLECTOR FOR A VEHICLE ROOF

(75) Inventors: Horst Böhm, Frankfurt (DE); Rainer Grimm, Frankfurt (DE); Karl Hörmann, Langdorf (DE); Hubert Bachmann, Dannstadt (DE); Christoph Boss, Frankfurt (DE); Carmelo Mondello, Frankfurt (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/382,968

(22) Filed: Mar. 6, 2003

(65) Prior Publication Data

US 2003/0168892 A1 Sep. 11, 2003

(30) Foreign Application Priority Data

Mar. 7, 2002 (DE) ......................................... 102 10 142

(51) Int. Cl.[7] .................................................. B60J 7/043
(52) U.S. Cl. .................. 296/217; 296/180.3; 296/180.5
(58) Field of Search ......................... 296/217, 91, 223, 296/180.1, 180.5, 180.3, 214

(56) References Cited

U.S. PATENT DOCUMENTS

| | | | | | |
|---|---|---|---|---|---|
| 4,084,846 A | * | 4/1978 | Wiley et al. | ............. | 296/180.3 |
| 4,206,942 A | * | 6/1980 | Nudo et al. | ............... | 296/180.5 |
| 4,380,351 A | * | 4/1983 | Sorensen et al. | ........... | 296/217 |
| 4,981,290 A | * | 1/1991 | Huyer | ........................ | 296/214 |
| 5,018,782 A | * | 5/1991 | Fiegel et al. | ................. | 296/217 |
| 5,018,783 A | * | 5/1991 | Chamings et al. | .......... | 296/217 |
| 5,398,985 A | * | 3/1995 | Robinson | ................. | 296/180.1 |
| 5,431,477 A | * | 7/1995 | Smith et al. | ................. | 296/217 |
| 5,538,316 A | * | 7/1996 | Bartholomew | ........... | 296/180.3 |
| 5,544,931 A | * | 8/1996 | Nelson | ..................... | 296/180.5 |
| 5,782,527 A | * | 7/1998 | Willey | ........................ | 296/217 |
| 6,217,110 B1 | * | 4/2001 | Thijssen | ..................... | 296/217 |
| 6,648,406 B2 | * | 11/2003 | Dittrich et al. | ............. | 296/217 |
| 6,666,503 B1 | * | 12/2003 | Sorensen | ..................... | 296/217 |
| 6,669,277 B2 | * | 12/2003 | Farber et al. | ............... | 296/217 |
| 2001/0017479 A1 | | 8/2001 | Birndorfer et al. | | |

FOREIGN PATENT DOCUMENTS

| | | | |
|---|---|---|---|
| DE | 25 01 663 | * | 7/1976 |
| DE | 29 35 344 C2 | | 11/1983 |
| DE | 196 03 670 | * | 4/1987 |
| DE | 36 22 663 | * | 1/1988 |
| DE | 38 33 865 | * | 4/1990 |
| DE | 40 39 485 C1 | | 5/1992 |
| DE | 44 02 314 A1 | | 8/1995 |
| DE | 195 20 348 | * | 8/1996 |
| DE | 195 20 348 C1 | | 8/1996 |
| DE | 195 18 696 A1 | | 11/1996 |
| DE | 196 03 670 C1 | | 4/1997 |
| EP | 0 744 311 | * | 11/1996 |
| FR | 2 418 735 | * | 3/1978 |
| GB | 2 139 165 | * | 11/1984 |

OTHER PUBLICATIONS

European Search Report, dated Feb. 2, 2004.
Search report, dated Mar. 12, 2002.

* cited by examiner

*Primary Examiner*—Kiran Patel
(74) *Attorney, Agent, or Firm*—Carlson, Gaskey & Olds

(57) ABSTRACT

A wind deflector for a vehicle roof comprises a flexible deflecting element attached between a base element and a raising device. The base element is mountable on a vehicle roof, and the raising device is pivotably connected to the base element to raise and lower the deflecting element. The deflecting element is air-permeable to allow air to flow through it and is flexible enough to be folded when the raising device is lowered. A resilient member biases the raising device in the raised position, stabilizing the flexible deflecting element and holding it taut enough to counteract pressure variations in a vehicle interior near a roof opening.

13 Claims, 9 Drawing Sheets

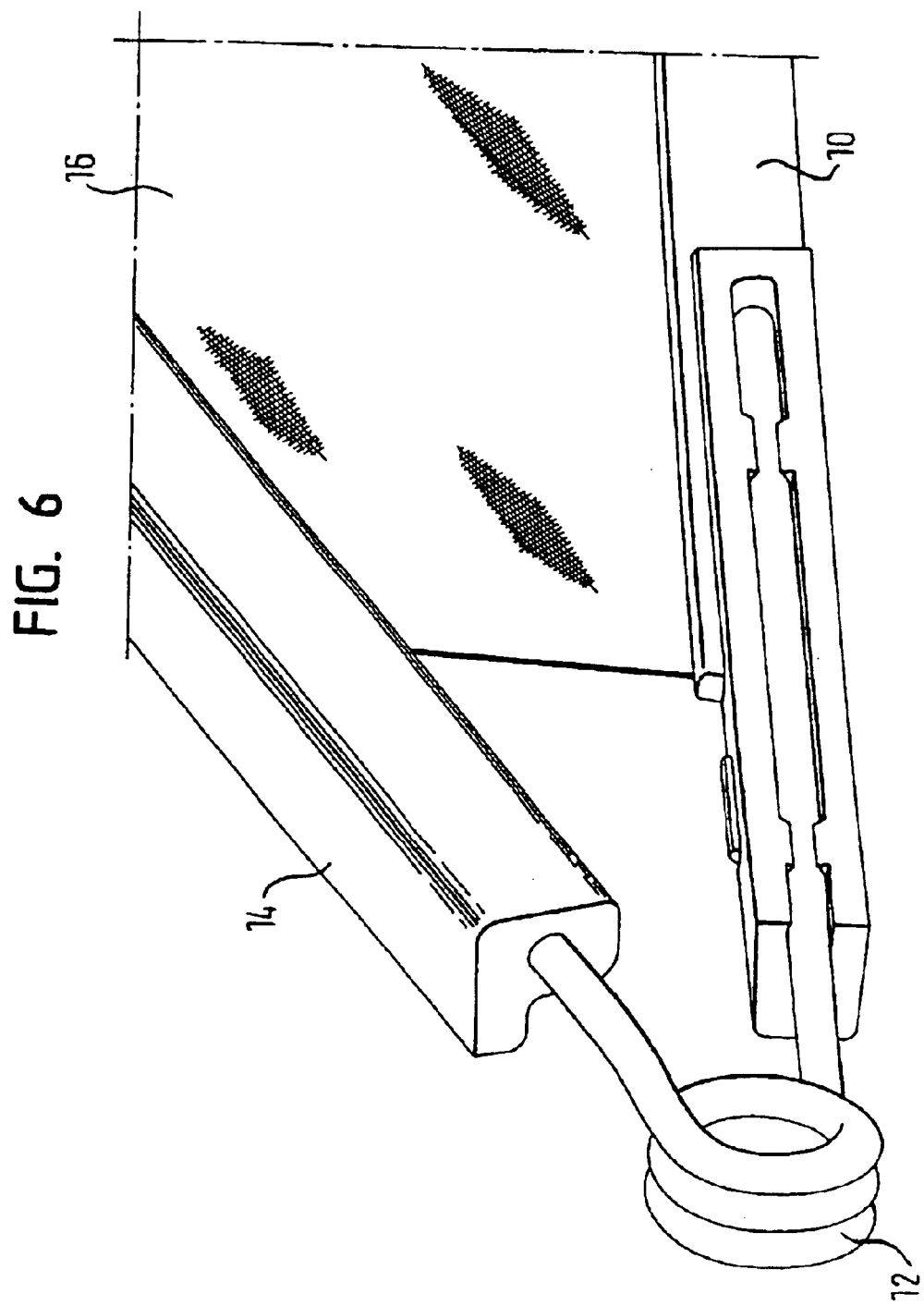

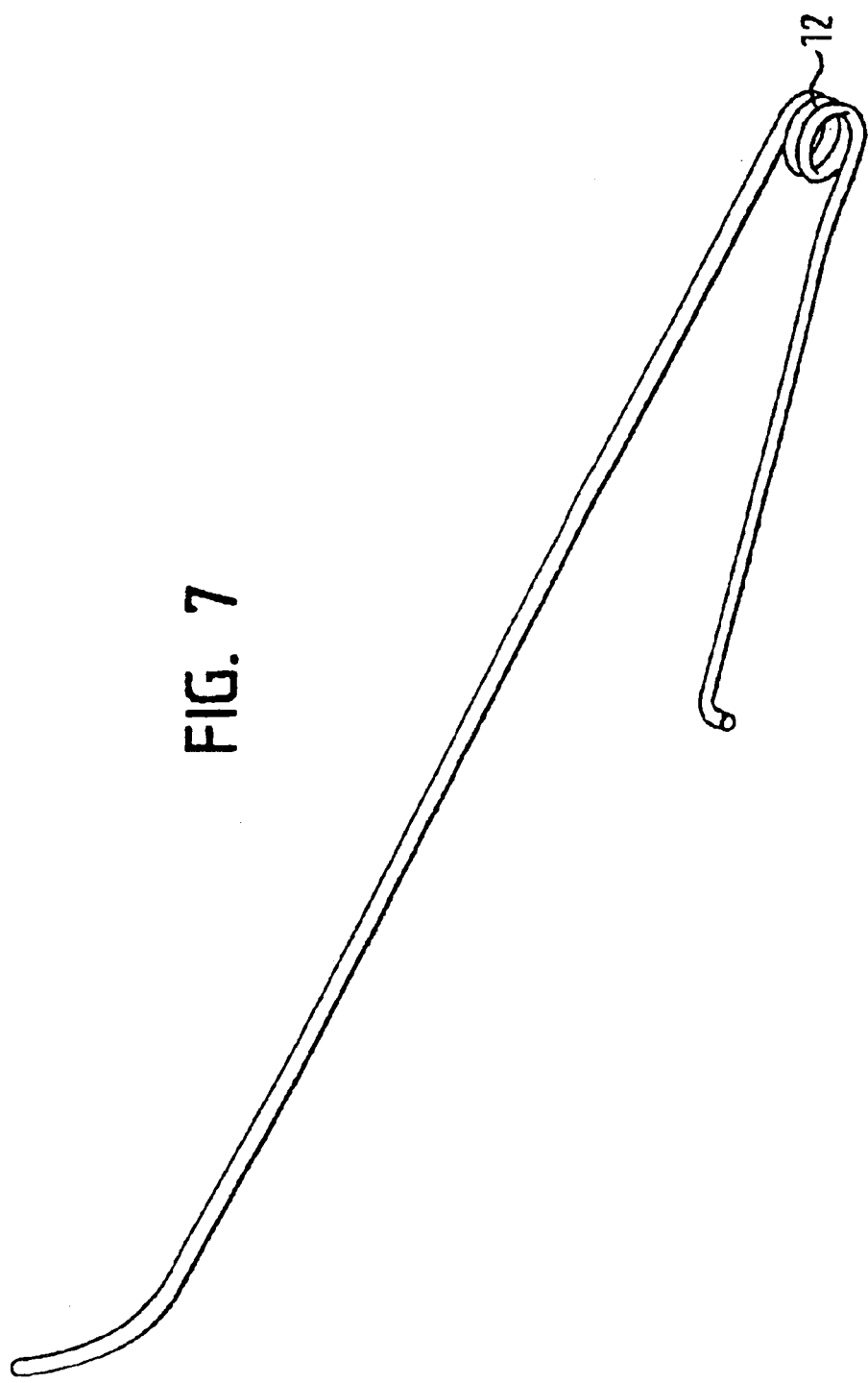

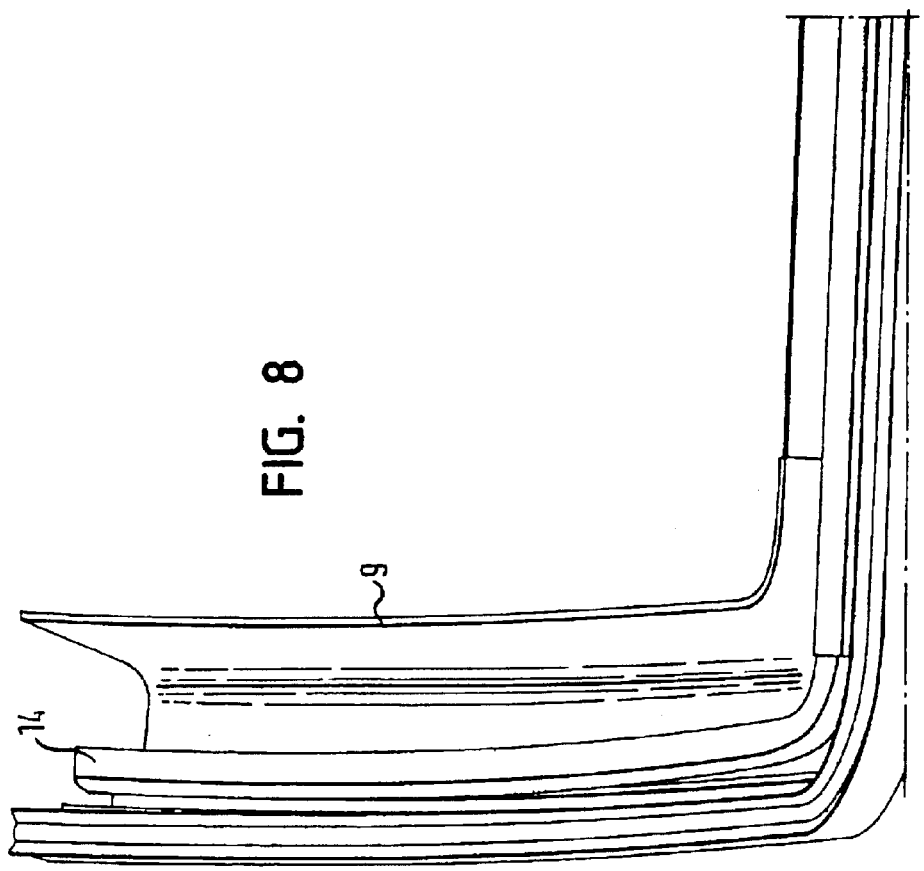

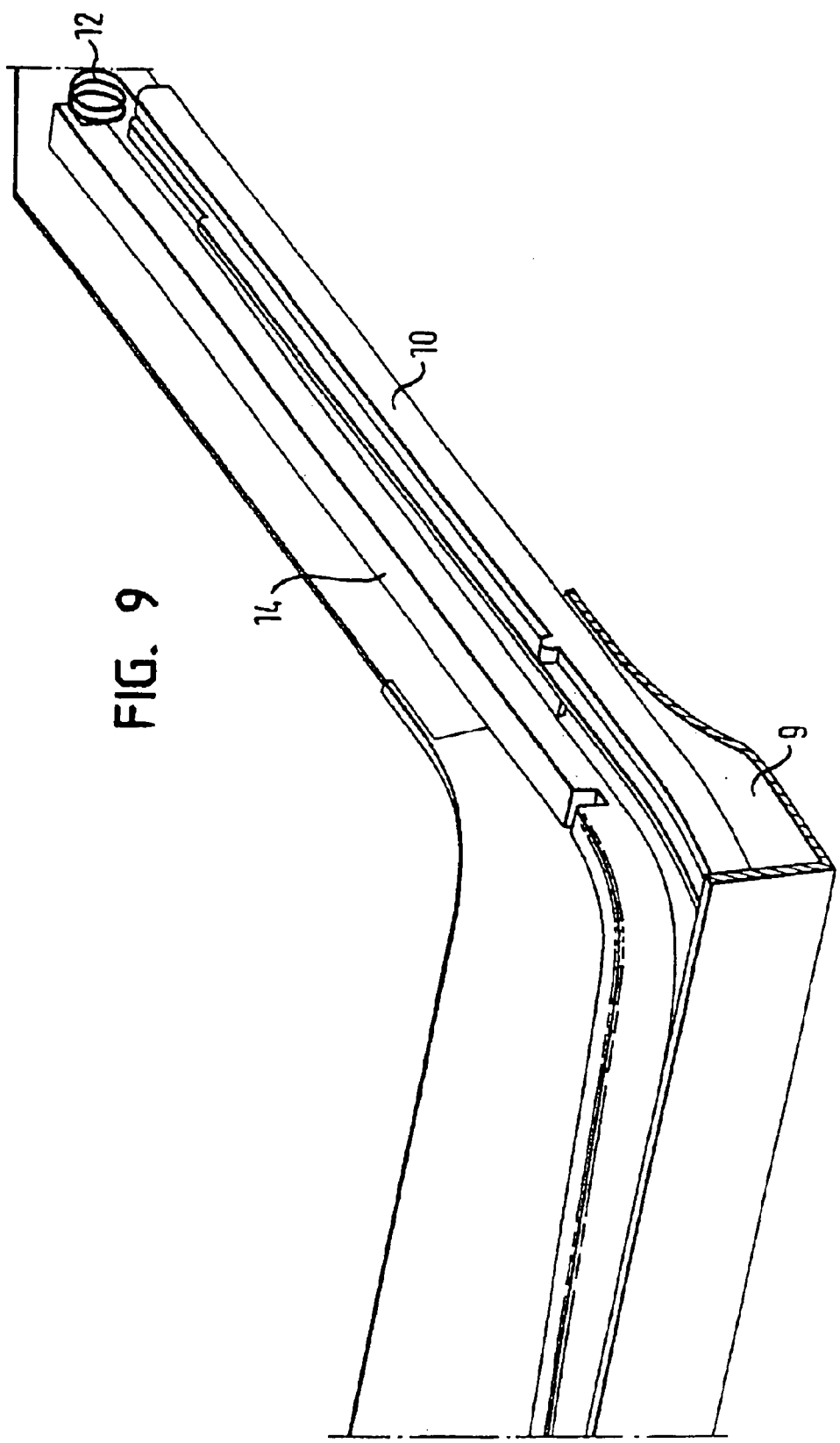

WIND DEFLECTOR FOR A VEHICLE ROOF

REFERENCE TO RELATED APPLICATIONS

The present invention claims priority to German Patent Application No. 102 10 142.6, filed Mar. 7, 2002.

TECHNICAL FIELD

The invention relates to vehicle roof devices, and more particularly to a wind deflector that can be used with a sliding vehicle roof system.

BACKGROUND OF THE INVENTION

Sliding roof systems can be used to improve ventilation and air flow in a vehicle. If the vehicle is traveling at low to moderate speeds while the sliding roof is open, however, periodical pressure variations may appear in the interior of the vehicle. These periodical pressure variations creating a "thrumming" noise that is unpleasant for people in the vehicle.

Wind deflectors have been designed to avoid these pressure variation problems and eliminate the noise accompanying the pressure variations. One example of a known wind deflector structure is shown in DE 40 39 485 C1. The wind deflector is usually arranged on the front edge of the roof opening exposed by a cover of the sliding roof system, where the front edge is viewed from the direction of forward vehicle travel. The wind deflector may also be attached so that it is transferable from a retracted position, where the wind deflector is situated underneath the outer face of the vehicle roof, to a raised position when the cover of the sliding roof system is opened.

Known wind deflector structures are usually rigid with a perforated, net-like portion over a large part of the wind deflector's surface area. The perforations allow air to flow through the wind deflector and form a finely turbulent air layer near the roof opening. This turbulent air layer counteracts pressure variations generated by the roof opening. However, currently known wind deflectors occupy a large amount of space and have a complex construction, making installation of the wind deflector expensive.

There is a desire for a wind deflector that has a simplified construction and occupies less space than currently known wind deflectors.

BRIEF SUMMARY OF THE INVENTION

The invention relates to a new wind deflector structure for a vehicle roof. The inventive wind deflector includes a base element that is mountable to the vehicle roof and a raising device that is pivotably connected to the base element. The wind deflector further comprises a flexible deflecting element attached to the base element and the raising device. The flexible deflecting element is made of a material that allows air to flow through it.

The inventive wind deflector also includes at least one resilient biasing member, such as a spring, that biases the raising device into a raised position to stretch the deflecting element between the base element and the raising device and form a substantially rigid wind deflecting structure. Because the deflecting element is flexible, it can be easily folded when not in use to save space.

BRIEF DESCRIPTION OF THE DRAWINGS

FIG. 6 is a detailed perspective view of the wind deflector of FIG. 1;

FIG. 7 is a perspective view of one embodiment of a biasing member in the inventive wind deflector;

FIG. 8 is a perspective view of the wind deflector in a retracted position;

FIG. 9 is another perspective view of the wind deflector in a retracted position.

DETAILED DESCRIPTION OF THE PREFERRED EMBODIMENT

Generally, a wind deflector according to the invention incorporates a flexible deflecting element that allows air to flow through it. The flexible deflecting element is attached to a base element mountable on a vehicle roof and to a raising device connected to the base element. The raising device and be raised and lowered to stretch and fold, respectively, the flexible deflecting element.

Figure 1:
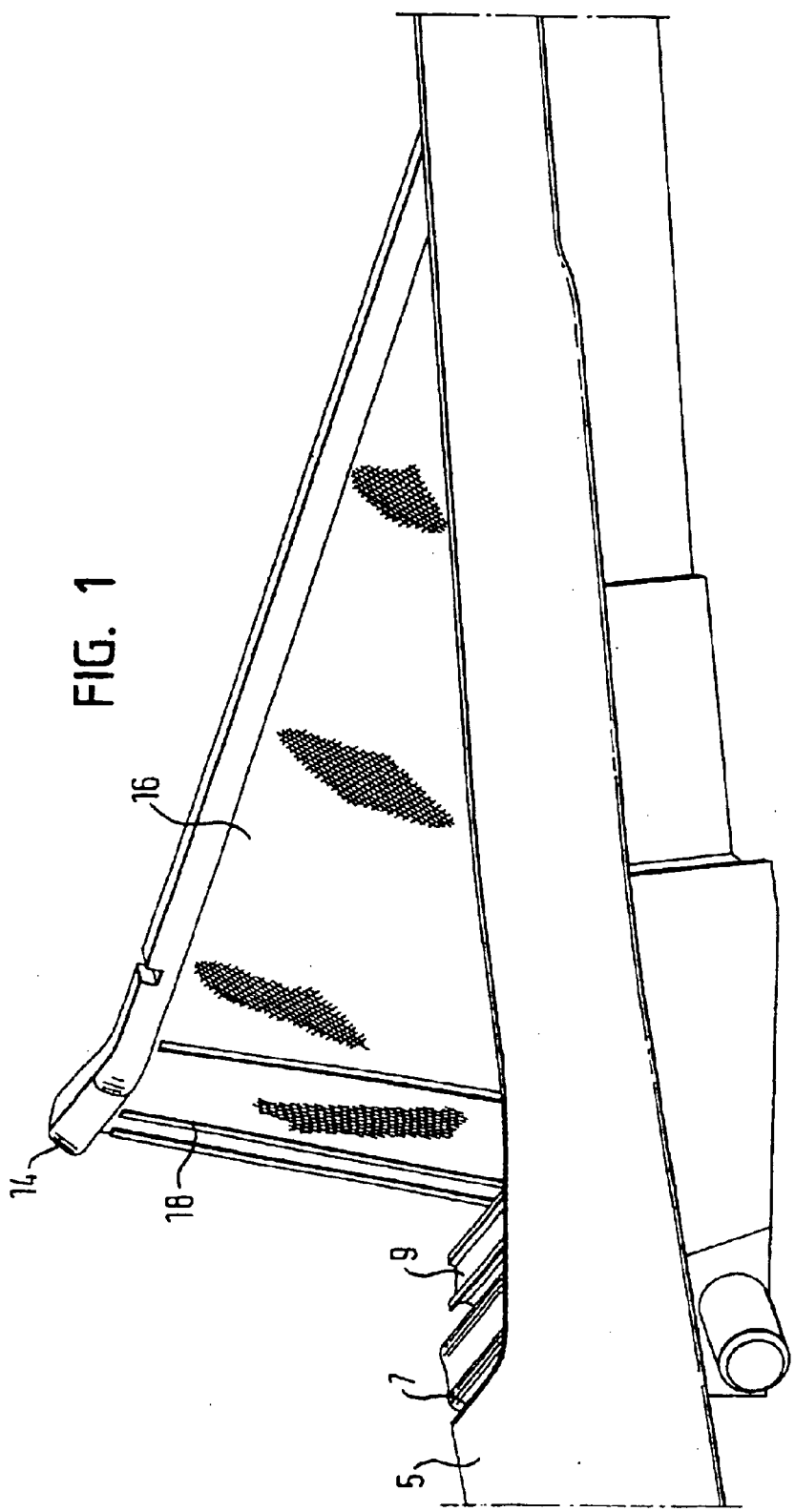
FIG. 1 is a perspective view of a wind deflector according to one embodiment of the invention in a raised condition and mounted to a vehicle roof.
Figure 2:
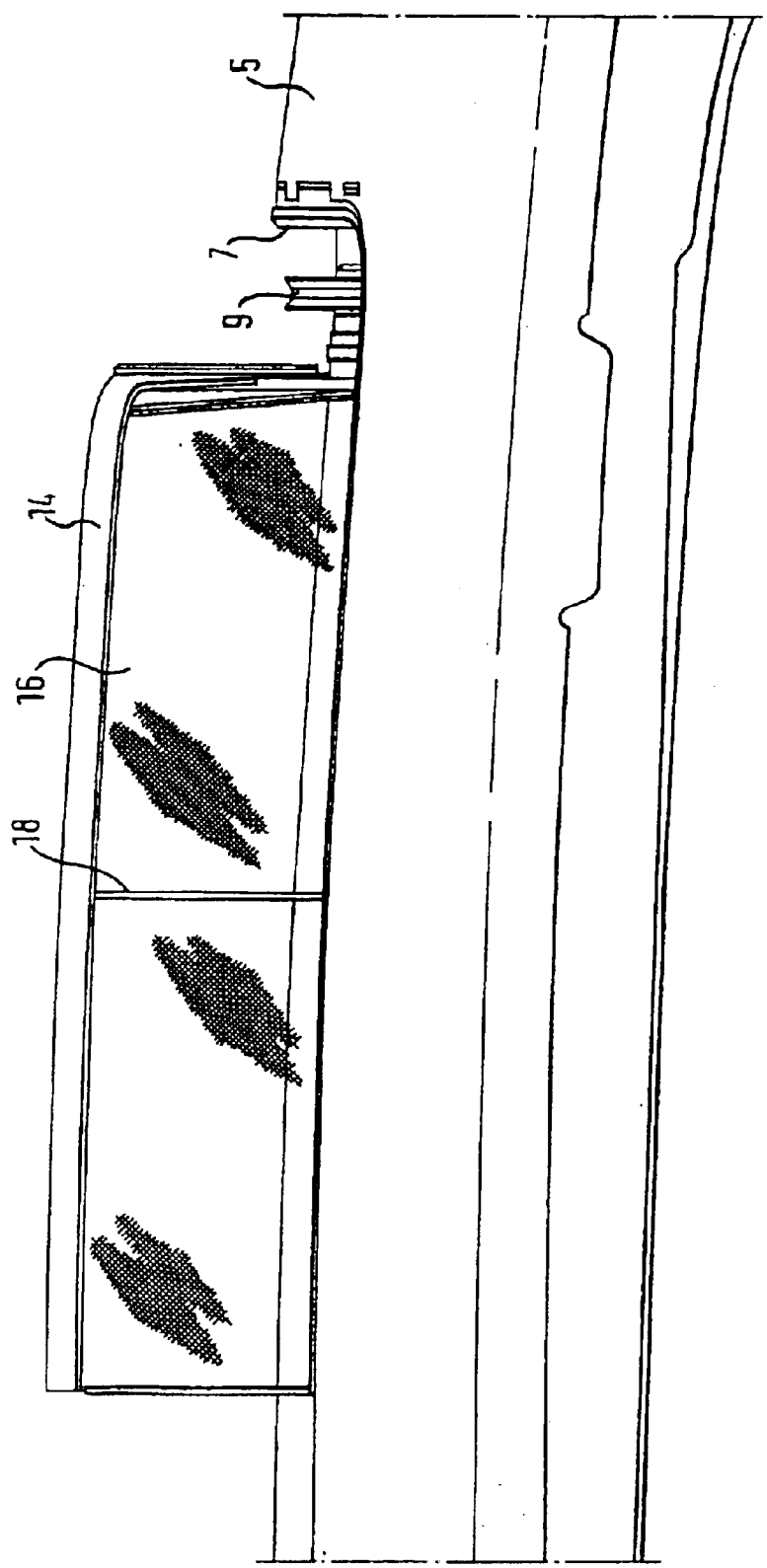
FIG. 2 is a front view of the wind deflector of FIG. 1.
Figure 3:
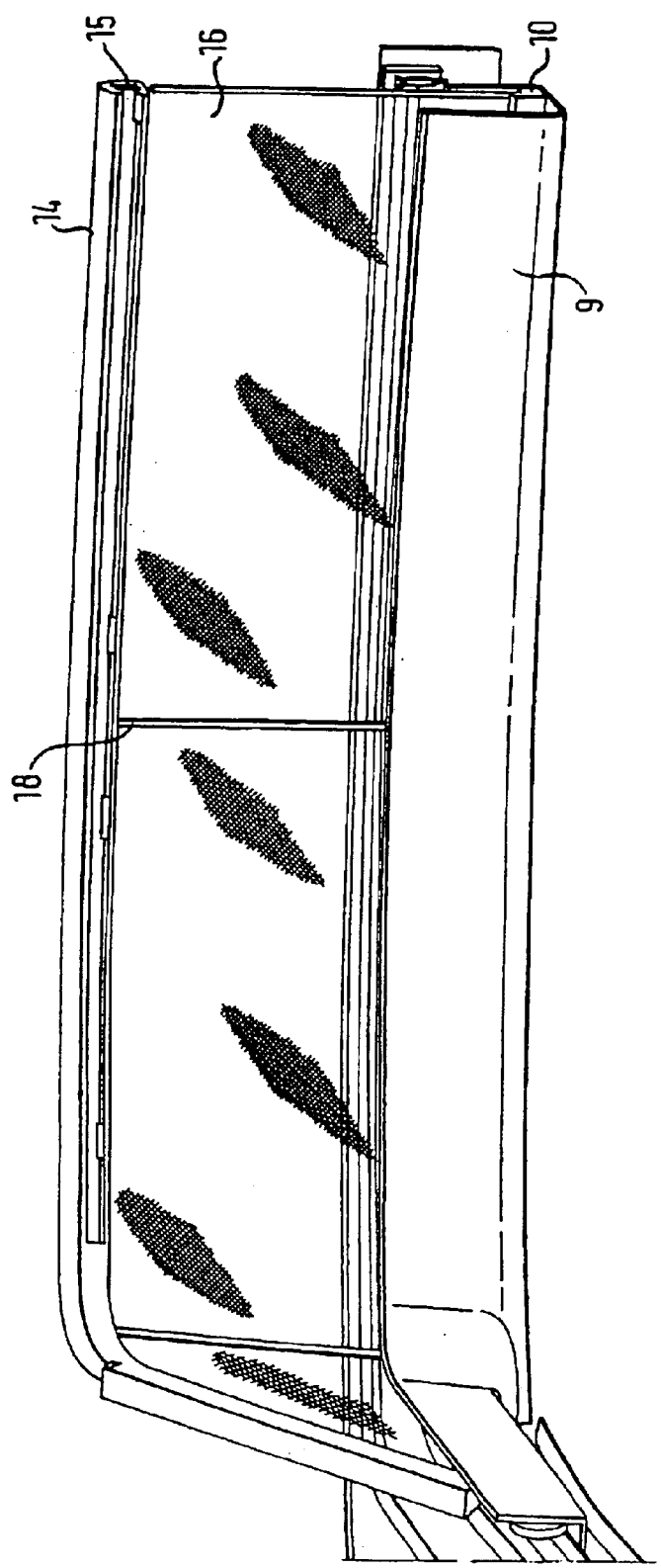
FIG. 3 is a rear view of the wind deflector of FIG. 1.
Figure 4:
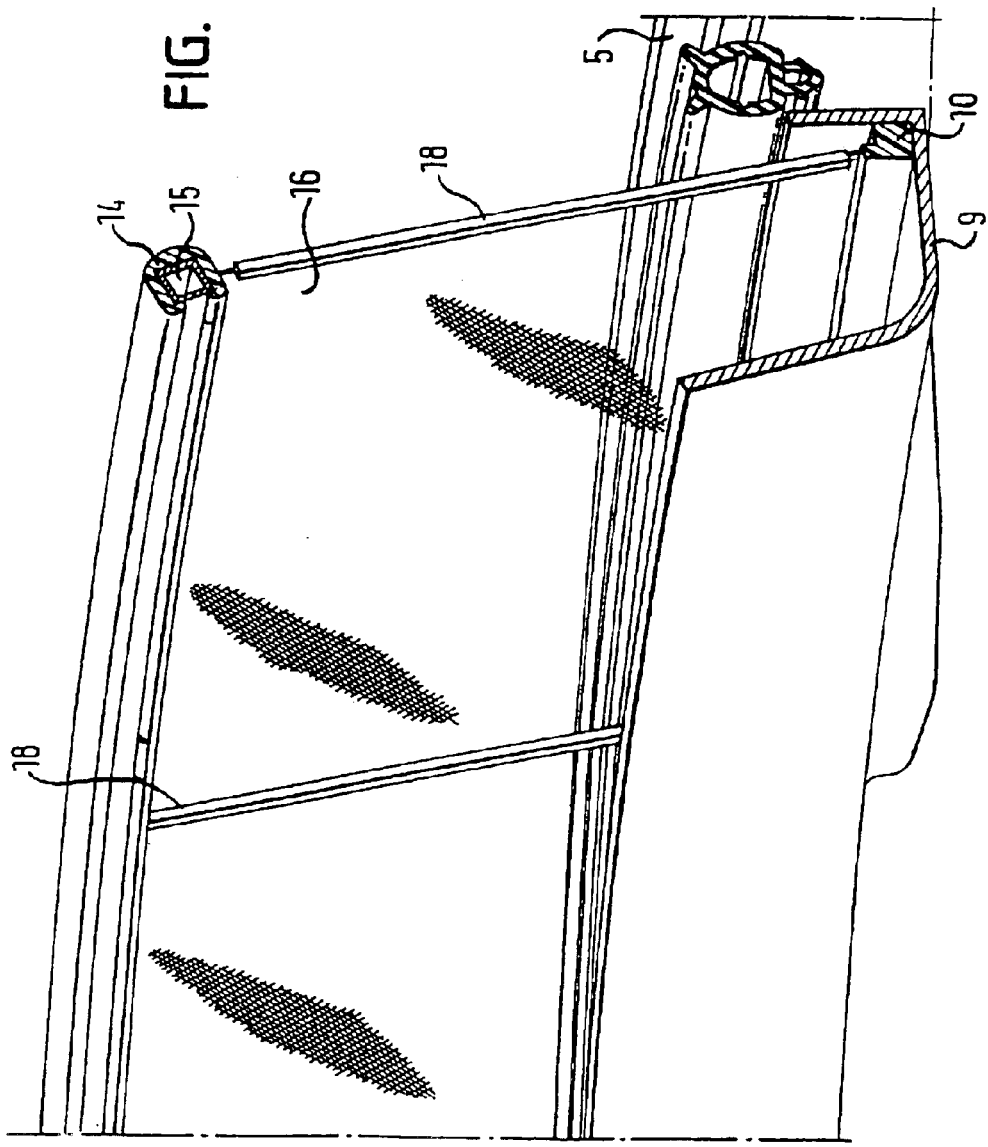
FIG. 4 is an enlarged sectional view of the wind deflector of FIG. 1.
Figure 5:
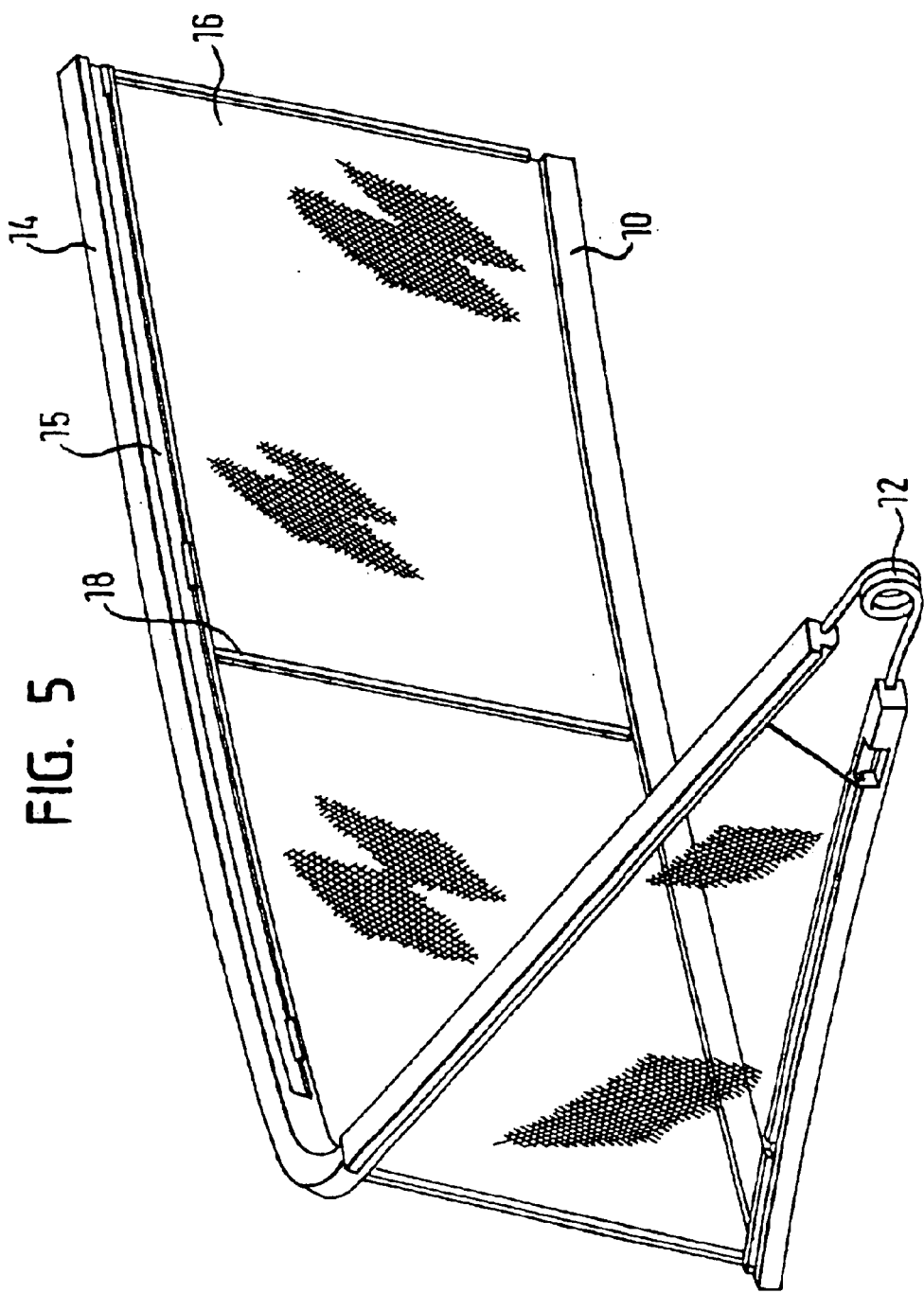
FIG. 5 is a perspective rear view of the wind deflector of FIG. 1 in a raised position.

FIGS. 1 through 5 illustrate one embodiment of the inventive wind deflector and its operating environment in more detail. A vehicle roof 5 has a roof opening 7 formed therein. The roof opening 7 can be closed with a cover in a sliding roof system (not shown). A mounting frame 9 that supports functional parts of the sliding roof system extends along the edge of the roof opening 7.

A base element 10 of the inventive wind deflector is mounted to the mounting frame 9. In one embodiment, the base element 10 is made of plastic and generally has a U-shape. A middle portion of the U-shaped base element 10 extends along a front edge of the roof opening 7, and each of the two legs of the base element 10 extend along a front portion of lateral edges of the roof opening 7.

The wind deflector also includes a U-shaped raising device 14 (FIGS. 6 and 7) connected to the base element 10 via a resilient member 12. In one embodiment, the resilient member 12 is a wire leg spring having two legs, with one leg of the spring attached to a leg of the base element 10 and the other leg of the spring attached to a leg of the raising device 14. The raising device 14 itself can also be made of plastic and have approximately the same profile as the base element 10. In one embodiment, a reinforcing element 15, such as a metal strip, may be attached to the raising device 14. A reinforcing element may also be attached to the base element 10 instead of or in addition to the reinforcement on the raising device 14.

The leg spring shown in FIG. 7 is a particularly simple construction because it is formed from a single wire and does not require multiple articulated pieces. The resilient member 12 may also be in the form of a plate spring.

The resilient member 12 acts as a hinge between the base element 10 and the raising device 14 and biases the raising device 14 into a raised position above the vehicle roof 5. FIGS. 1 through 4 show the raising device 14 in the raised position. If a force opposing the biasing force of the resilient member 12 is applied on the raising device 14, the raising device can be transferred into a retracted position, examples or which are shown in FIGS. 8 and 9. When the raising device 14 is in the retracted position, the raising device 14 is received underneath an outer face of the vehicle roof 5 in the mounting frame 9. The raising device 14 can be moved from the raised position into the retracted position. For example, the cover of the sliding roof system or any known guiding structure runs along the legs of the raising device 14 and urges the legs of the raising device 14 from their upward, obliquely extending position downward to the retracted position.

A flexible deflecting element 16 extends between the base element 10 and the raising device 14. In one embodiment, the deflecting element 16 can be a flexible, substantially planar or sheet-like material having air-permeable properties that allow air to pass through the material. Possible deflecting element 16 materials include fabric, foil or plastic. Other sheet materials having air-permeable properties may also be used. The deflecting element 16 can be attached to the base element 10 and the raising device 14 via any known means. In one embodiment, the deflecting element 16 is incorporated into the base element 10 and the raising device 14 during an injection-molding process.

As noted above, the resilient member 12 biases the raising device 14 into a raised position. In this raised position, the deflecting element 16 is stretched taut between the base element 10 and the raising device 14, causing the deflecting element 16 to act as if it is made from a rigid material. The biasing force of the resilient member 12 and the tension in the deflecting element 16 provide the stability necessary for proper operation of the wind deflector, but the flexibility of the deflecting element 16 still allows the element 16 to be folded into a compact shape when the raising device 14 is lowered to the retracted position. As a result, the inventive wind deflector has the same wind deflecting characteristics as rigid wind deflectors without their associated complexity and space occupation.

Structural elements 18 may be applied to or incorporated directly into the deflecting element 16 by any desired process, such as injection molding. In one embodiment, the structural elements 18 are made of a flexible plastic material and can be pre-curved or pretensioned to maintain the deflecting element 16 in a desired shape when it is folded. The structural elements 18 are also useful to support the deflecting element 16 if the resilient member 12 does not pull the deflecting element 16 completely taut between the raising device 14 and the base element 10. By incorporating the structural elements 18, the shape of the deflecting element 16 when it is raised and folded is consistently reproducible even after the raising device 14 has been repeatedly raised and retracted over time. Thus, the structural elements 18 provide additional support for the deflecting element 16 both when the deflecting element 16 is folded and when the deflecting element 16 is raised.

Thus, the inventive wind deflector incorporates a flexible, rather than rigid, deflecting element, allowing the deflecting element to be folded into a compact shape when not in use. This flexible structure reduces the space taken up by the wind deflector and simplifies its overall structure. Further, because the inventive wind deflector uses the biasing force of a resilient member to stretch the deflecting element in a raised position, the invention creates a rigid wind deflector without requiring the deflecting element itself to be a rigid material.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A wind deflector for a vehicle roof, comprising:
    a base element that is mountable on the vehicle roof;
    a raising device pivotably connected to the base element and movable between a raised position and a retracted position;
    a substantially planar flexible deflecting element mounted to the base element and the raising device, wherein the deflecting element is permeable to air; and
    at least one resilient member that biases the raising device into a raised position.

2. The wind deflector of claim 1, wherein the deflecting element is stretched between the base element and the raising device when the raising device is in the raised position.

3. The wind deflector of claim 1, wherein the base element and the raising device each have a first leg and a second leg, and wherein said at least one resilient member comprises a first resilient member coupling the first leg of the base element to the first leg of the raising device and a second resilient member coupling the second leg of the base element to the second leg of the raising device.

4. The wind deflector of claim 1, wherein said at least one resilient member is selected from the group consisting of a leg spring and a plate spring.

5. The wind deflector of claim 4, wherein the leg spring has a first leg attached to the base element and a second leg attached to the raising device.

6. The wind deflector of claim 1, wherein the base element and the raising device are made of plastic.

7. The wind deflector of claim 1, further comprising at least one structural element attached to the deflecting element, wherein said at least one structural element maintains the deflecting element in a first shape when the raising device is in the raised position and maintains the deflecting element in a second shape when the raising device is in the retracted position.

8. The wind deflector of claim 7, wherein said at least one structural element is curved.

9. The wind deflector of claim 7, wherein said at least one structural element is incorporated into the deflecting element.

10. The wind deflector of claim 1, further comprising at least one reinforcing element attached to at least one of the base element and the raising device.

11. The wind deflector of claim 10, wherein said at least one reinforcing element is attached to the raising device.

12. The wind deflector of claim 10, wherein said at least one reinforcing element is made of metal.

13. The wind deflector of claim 1, wherein the deflecting element is made of a material selected from the group consisting of fabric, foil and plastic.

* * * * *